(12) United States Patent
Kukita et al.

(10) Patent No.: US 7,423,521 B2
(45) Date of Patent: Sep. 9, 2008

(54) VEHICULAR VISUAL ASSISTANCE SYSTEM

(75) Inventors: Tomoyuki Kukita, Miyazaki-gun (JP);
Hiroshi Sakamoto, Miyazaki-gun (JP)

(73) Assignee: Kabushiki Kaisha Honda Lock, Miyazaki (JP)

( * ) Notice: Subject to any disclaimer, the term of this patent is extended or adjusted under 35 U.S.C. 154(b) by 0 days.

(21) Appl. No.: 11/266,753

(22) Filed: Nov. 3, 2005

(65) Prior Publication Data

US 2006/0132601 A1 Jun. 22, 2006

(30) Foreign Application Priority Data

Dec. 7, 2004 (JP) ............... 2004-353607
Dec. 7, 2004 (JP) ............... 2004-353608

(51) Int. Cl.
*G08G 1/017* (2006.01)
*G08G 1/054* (2006.01)
*G08B 23/00* (2006.01)

(52) U.S. Cl. ............. 340/425.5; 340/693.9; 340/937

(58) Field of Classification Search ......... 340/435–437, 340/686.1, 686.6, 693.5, 815.73–815.77, 340/937; 348/113, 118–120, 148, 149; 701/300–302; 359/548, 839, 848, 843, 844

See application file for complete search history.

(56) References Cited

U.S. PATENT DOCUMENTS

| | | | |
|---|---|---|---|
| 5,680,123 A | 10/1997 | Lee et al. | |
| 6,298,290 B1 * | 10/2001 | Abe et al. | 701/35 |
| 6,476,855 B1 | 11/2002 | Yamamoto | |
| 7,069,128 B2 * | 6/2006 | Iwama | 701/36 |
| 7,136,091 B2 * | 11/2006 | Ichikawa et al. | 348/148 |
| 7,248,283 B2 * | 7/2007 | Takagi et al. | 348/118 |
| 2002/0001399 A1 | 1/2002 | Yoshida et al. | |
| 2002/0105438 A1 * | 8/2002 | Forbes et al. | 340/901 |
| 2002/0118282 A1 | 8/2002 | Nakamura | |
| 2003/0080877 A1 | 5/2003 | Takagi et al. | |
| 2003/0103142 A1 * | 6/2003 | Hitomi et al. | 348/148 |
| 2003/0122930 A1 | 7/2003 | Schofield et al. | |
| 2004/0119823 A1 * | 6/2004 | Takagi et al. | 348/148 |

(Continued)

FOREIGN PATENT DOCUMENTS

EP 1168248 1/2002

(Continued)

*Primary Examiner*—Benjamin C. Lee
*Assistant Examiner*—Jennifer Mehmood
(74) *Attorney, Agent, or Firm*—Carrier, Blackman & Associates; Willaim D. Blackman; Joseph P. Carrier

(57) ABSTRACT

In a vehicular visual assistance system, an image picked up by an image pickup device is processed by an image processing device, and displayed on a display monitor. The image pickup device is mounted on a lower part of a door mirror housing, and is capable of picking up an image of a region that is continuous in the fore-and-aft direction. The imaged region includes part of a front region directly viewed by a vehicle driver, and part of a rear region indirectly viewed by the vehicle driver via a door mirror. The image processing device displays, on the display monitor, an imaged region for which at least front and rear boundaries thereof of the viewed regions overlap. Thus, it is possible to avoid a blind spot from occurring between the direct and indirect views and the image based on the picked up image, thereby improving visibility.

15 Claims, 13 Drawing Sheets

U.S. PATENT DOCUMENTS

2005/0190082 A1   9/2005   Kumata et al.

FOREIGN PATENT DOCUMENTS

| EP | 1308346 | 5/2003 |
| EP | 1308396 | 5/2003 |
| EP | 1547866 | 6/2005 |
| JP | 2001-130324 A * | 5/2001 |
| JP | 2002-067794 | 3/2002 |
| JP | 2003-125396 | 4/2003 |
| JP | 2003-125396 A * | 4/2003 |

* cited by examiner

VEHICULAR VISUAL ASSISTANCE SYSTEM

RELATED APPLICATION DATA

Japanese priority application Nos. 2004-353607 and 2004-353608, upon which the present application is based, are hereby incorporated in their entirety herein by reference.

BACKGROUND OF THE INVENTION

1. Field of the Invention

The present invention relates to a vehicular visual assistance system comprising: image pickup means mounted on a housing of a door mirror, the image pickup means being capable of picking up an image of a fore-and-aft region sideward of a vehicle; a display monitor provided within a vehicle compartment, the display monitor being visible to a vehicle driver; and image processing means for displaying on the display monitor an image obtained by processing an image signal from the image pickup means.

2. Description of the Related Art

Japanese Patent Application Laid-open No. 2002-67794 discloses an arrangement in which images of the front and rear regions sideward of a vehicle are picked up simultaneously by an image pickup system provided in a lower part of a housing of a door mirror, and the picked up images are displayed on a monitor within a vehicle compartment.

The view sideward of a vehicle obtained by a vehicle driver on a driver's seat is a combination of a front side direct view through a windshield, a rear side indirect view obtained via a door mirror, and an image obtained by the image pickup system. However, the above-mentioned arrangement has a possibility that blind spots might occur between the direct and indirect views and the image obtained by the image pickup system, and it is difficult to check the safety in the blind spot areas. Moreover, since it is impossible to receive an impression that the direct view, the indirect view, and the image are continuous, the visibility for the vehicle driver is degraded.

SUMMARY OF THE INVENTION

The present invention has been accomplished under the above-mentioned circumstances, and it is an object thereof to provide a vehicular visual assistance system that avoids the occurrence of blind spots sideward of a vehicle between direct and indirect views and an image picked up by image pickup means, thus giving an excellent visibility.

In order to achieve the above object, according to a first feature of the present invention, there is provided to a vehicular visual assistance system comprising: image pickup means mounted on a housing of a door mirror, the image pickup means being capable of picking up an image of a fore-and-aft region sideward of a vehicle; a display monitor provided within a vehicle compartment, the display monitor being visible to a vehicle driver; and image processing means for displaying on the display monitor an image obtained by processing an image signal from the image pickup means, wherein the image pickup means is mounted on a lower part of the housing and is capable of picking up an image of a region which is continuous in the fore-and-aft direction while simultaneously including part of a front region directly viewed by a vehicle driver on a driver's seat and part of a rear region indirectly viewed by the vehicle driver via the door mirror, and wherein the image processing means displays on the display monitor a picked up image of a region, among the regions whose images have been picked up by the image pickup means, for which at least front and rear boundaries thereof overlap the rear edge of the directly viewed region and the front edge of the indirectly viewed region, respectively.

With the first feature of the present invention, the display monitor within the vehicle compartment displays a picked up image of the region sideward of the vehicle that is continuous in the fore-and-aft direction while including at least the rear edge of the region viewed directly by the vehicle driver and the front edge of the region viewed indirectly by the vehicle driver. Therefore, no blind spots occur between the direct and indirect views and the picked up image picked up by the image pickup means, and the vehicle driver can easily check the safety over a region long in the fore-and-aft direction sideward of the vehicle. Moreover, since the vehicle driver receives an impression that the direct and indirect views and the picked up image are continuous, the visibility for the vehicle driver can be improved.

According to a second feature of the present invention, in addition to the first feature, the image processing means has a function of displaying on the display monitor an enlarged picked up image of only a necessary part based on an instruction from the vehicle driver. With such an arrangement, since it is possible to enlarge and display only a section required by the vehicle driver, an obstacle, etc. present sideward of the vehicle can be recognized reliably.

According to a third feature of the present invention, in addition to the first or second feature, the image pickup means are mounted respectively on housings of left and right door mirrors; and the image processing means displays picked up images spaced from each other on the left and right parts of the display monitor, based on image signals from left and right image pickup means. With such an arrangement, since the fore-and-aft regions on the left and right sides of the vehicle can be displayed on the display monitor in a clearly discriminated manner, the visibility for the vehicle driver is further improved.

According to a fourth feature of the present invention, in addition to the first or second feature, the image pickup means are mounted respectively on housings of left and right door mirrors; and when the vehicle changes direction the image processing means selects a picked up image based on, among image signals from the left and right image pickup means, the image signal from the side to which the direction changes, and displays it on the display monitor. With such an arrangement, by displaying on the display monitor a picked up image on, among opposite sides of the vehicle, the side to which the direction changes, the visibility for the vehicle driver is further improved.

According to a fifth feature of the present invention, in addition to the first feature, the image pickup means is mounted on a lower part of the housing so that an optical axis intersects a straight line which runs through an outer edge of a contact area of a front wheel of the vehicle and which is parallel to the fore-and-aft direction of the vehicle. With such an arrangement, since the image pickup means is disposed so that the optical axis intersects the straight line that runs through the outer edge of the contact area of the front wheel of the vehicle and is parallel to the fore-and-aft direction of the vehicle, it is possible to reliably display the front wheel part on the display monitor so that a blind spot does not occur sideward of the vehicle, and the side edge of the vehicle is displayed on the display monitor so as to extend in a straight line without any distortion, thereby obtaining an excellent visibility.

According to a sixth feature of the present invention, in addition to the first feature, the image pickup means is mounted on a lower part of the housing so that an optical axis intersects a straight line joining together outer edges of contact areas of a front wheel and a rear wheel of the vehicle. With such an arrangement, since the image pickup means is disposed so that the optical axis intersects the straight line joining together the outer edges of the contact areas of the front wheel and the rear wheel of the vehicle, it is possible to reliably display the front wheel part and the rear wheel part on the display monitor so that a blind spot does not occur sideward of the vehicle, and the side edge of the vehicle is displayed on the display monitor so as to extend in a straight line without any distortion, thereby obtaining an excellent visibility.

According to a seventh feature of the present invention, in addition to the first feature, the image pickup means is mounted on a lower part of the housing so that an optical axis intersects a straight line joining together an outer edge of a contact area of a front wheel of the vehicle and a point that is a projection on a road surface of an outer edge of a vehicle body positioned outside a rear wheel in a portion corresponding to the rear wheel of the vehicle. With such an arrangement, since the image pickup means is disposed so that the optical axis intersects the straight line joining together the outer edge of the contact area of the front wheel of the vehicle and the point that is a projection on the road surface of the outer edge of the vehicle body positioned outside the rear wheel in the portion corresponding to the rear wheel of the vehicle, it is possible to reliably display the front wheel part on the display monitor so that a blind spot does not occur sideward of the vehicle, and the side edge of the vehicle is displayed on the display monitor so as to extend in a straight line without any distortion, thereby obtaining an excellent visibility.

The above-mentioned characteristics, other characteristics, and advantages of the present invention will become apparent from preferred embodiments that will be described in detail below by reference to the attached drawings.

BRIEF DESCRIPTION OF THE DRAWINGS

FIG. 1 to FIG. 11 show a first embodiment of the present invention wherein

FIG. 1 is a side view of a vehicle,

FIG. 2 is a plan view of the vehicle,

FIG. 3 is a front view of a left half of the vehicle,

FIG. 4 is a view of left and right door mirrors and an instrument panel taken from the vehicle compartment side, FIG. 5 is a block diagram showing the arrangement of a visual assistance system, FIG. 6 is a diagram for explaining a display state on a display monitor according to driving conditions of the vehicle, FIG. 7 is a diagram showing a displayed image based on images picked up by left and right image pickup means, FIG. 8 is a diagram for explaining an instruction via a touch panel on the display monitor, FIG. 9 is a diagram showing a case of an image being enlarged by an instruction via the touch panel, FIG. 10 is a diagram showing a case of a displayed image being distorted, and FIG. 11 is a diagram showing a case of a blind spot occurring in a displayed image.

DESCRIPTION OF PREFERRED EMBODIMENTS

Figure 1:
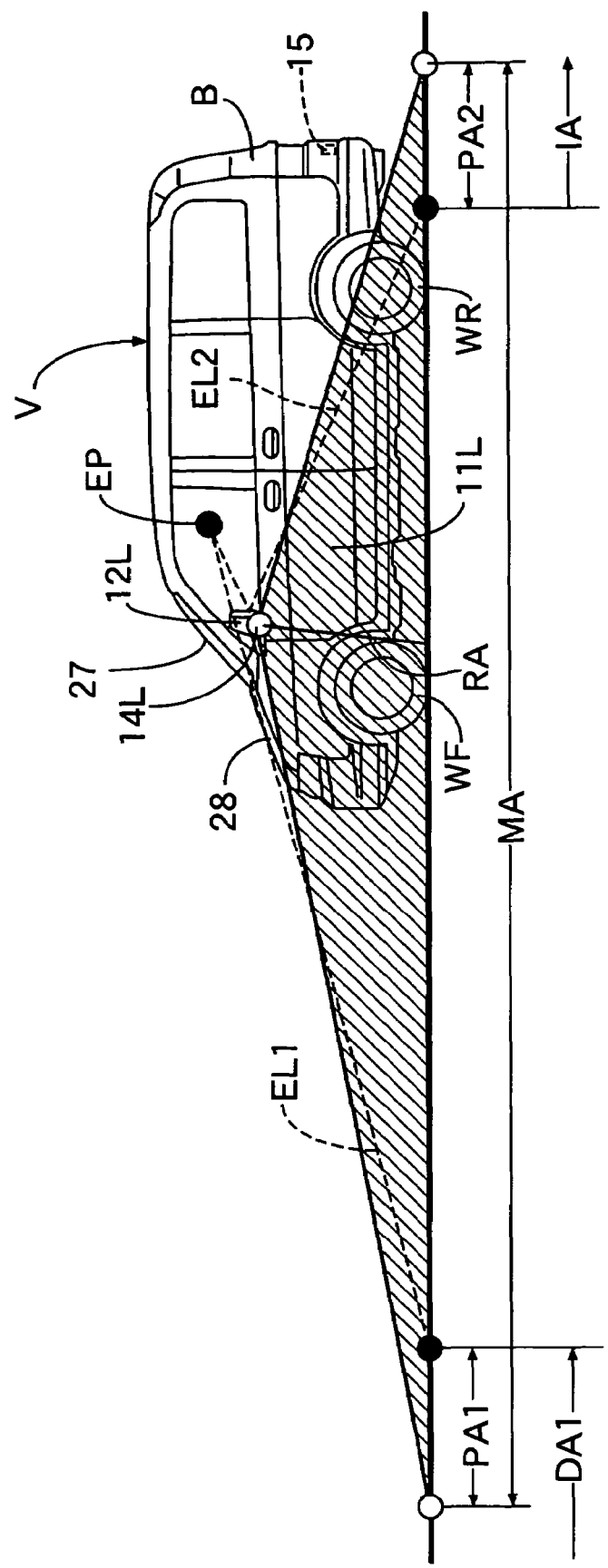
Figure 2:
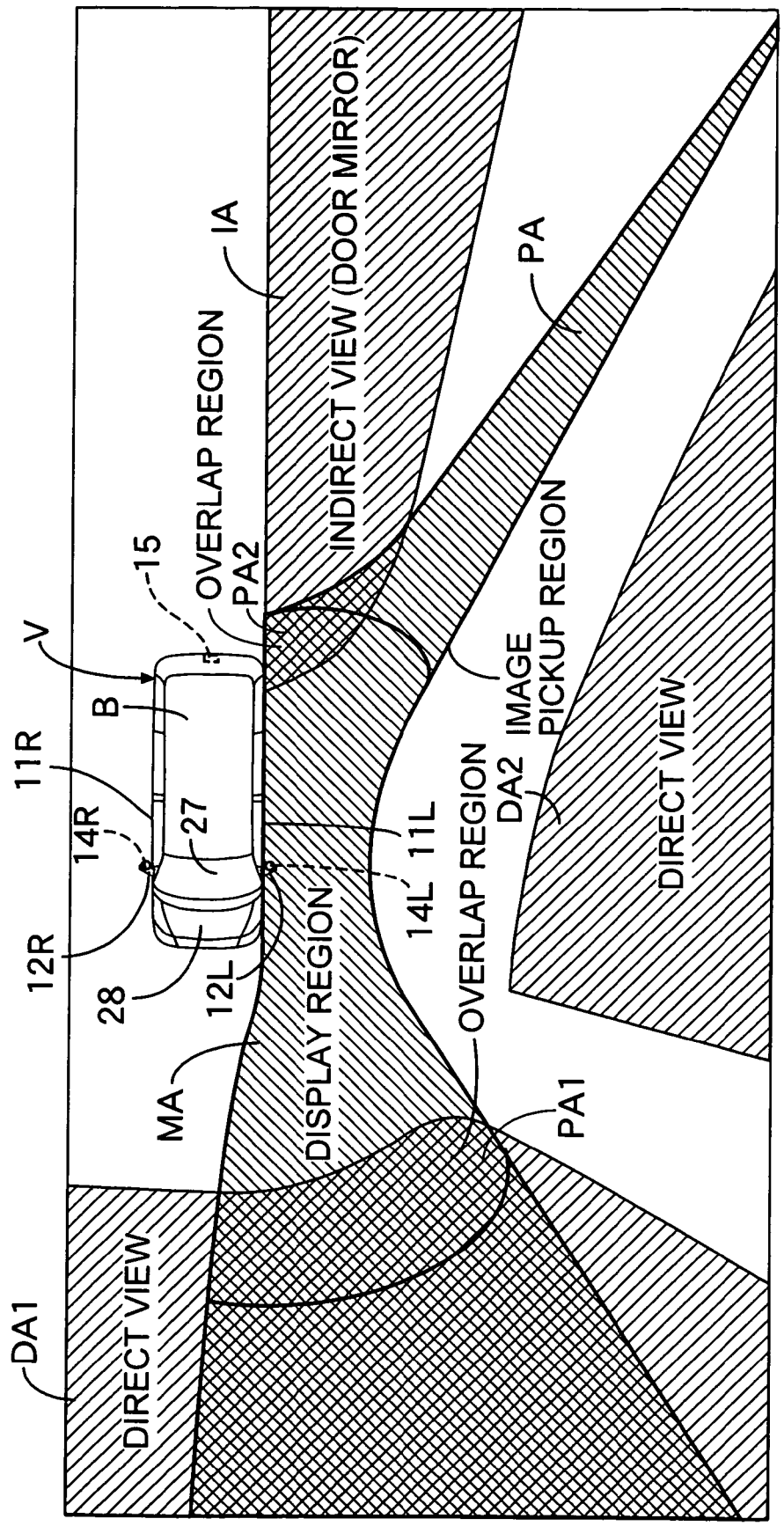

A first embodiment of the present invention is explained below by reference to FIG. 1 to FIG. 11. Referring first to FIG. 1 and FIG. 2, left and right door mirrors 12L and 12R are disposed respectively on a front left door 11L and a front right door 11R disposed on the left and right of a vehicle V. Left and right image pickup means 14L and 14R are mounted respectively on the door mirrors 12L and 12R. The left and right image pickup means 14L and 14R are capable of picking up an image of the front-to-rear region sideward of the vehicle V. Further, rear image pickup means 15 is mounted on a lower part at the rear end of a vehicle body B. The rear image pickup means 15 is capable of picking up an image in the rear of the vehicle V.

Figure 3:
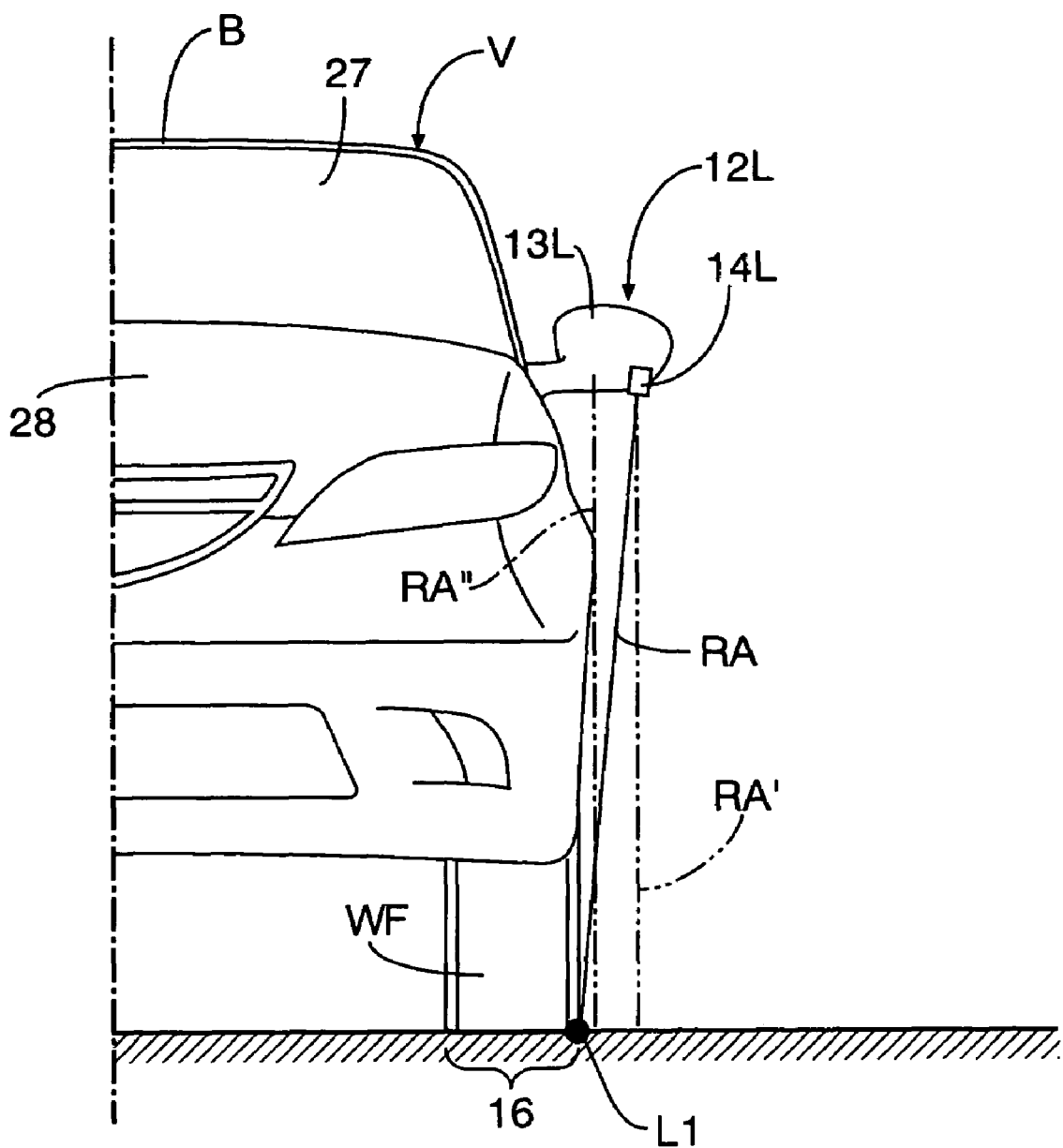
Figure 4:
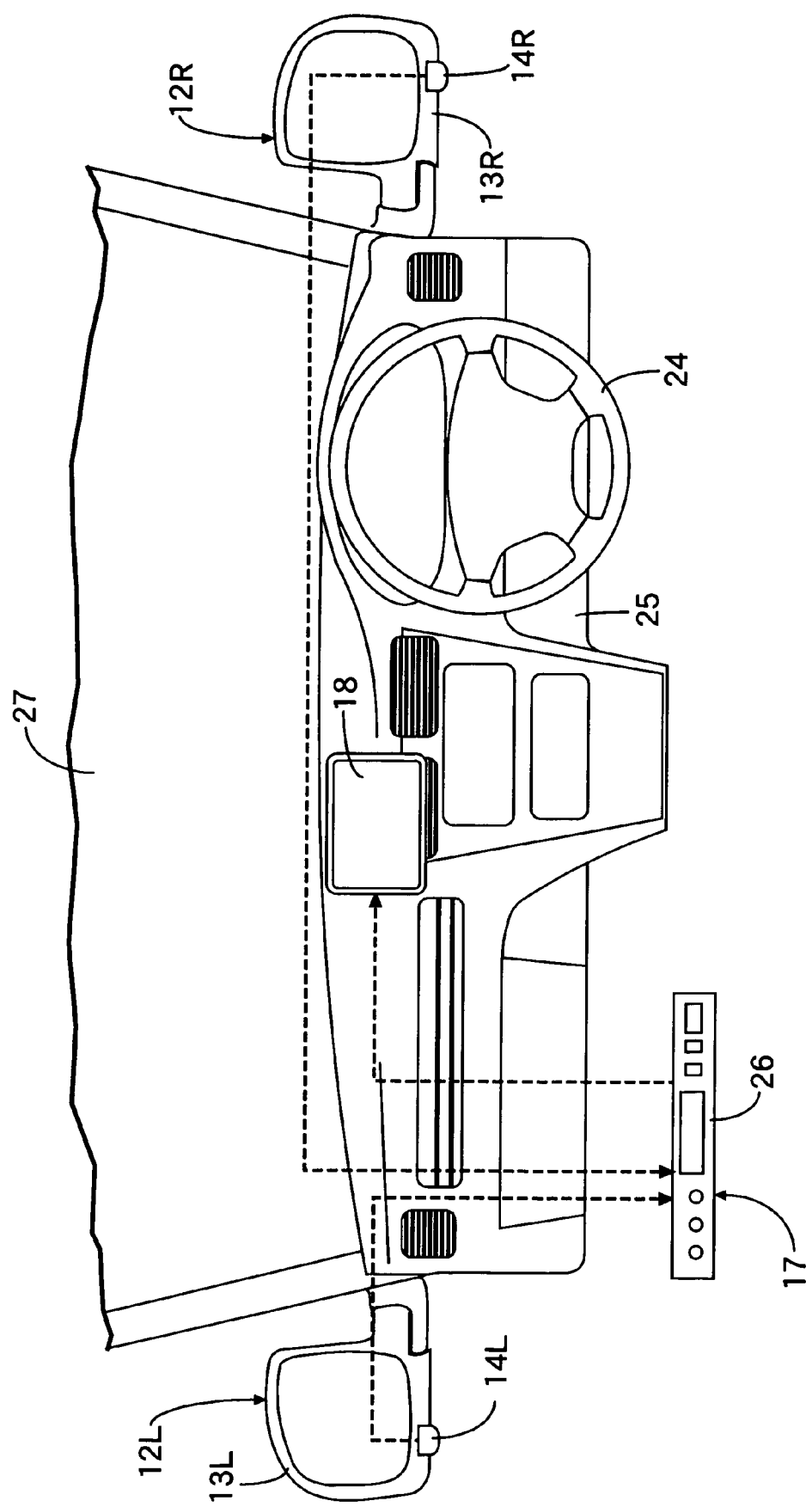

In FIG. 3 and FIG. 4, the left and right image pickup means 14L and 14R are mounted on lower parts of housings 13L and 13R of the left and right door mirrors 12L and 12R. The left image pickup means 14L is mounted on the lower part of the housing 13L so that an optical axis RA of the left image pickup means 14L intersects a straight line L1 that runs through the outer edge of a contact area 16 of a left front wheel WF and is parallel to the fore-and-aft direction of the vehicle V. The right image pickup means 14R is similarly mounted on the lower part of the housing 13R so that an optical axis thereof intersects a straight line that runs through the outer edge of a contact area of a right front wheel and is parallel to the fore-and-aft direction of the vehicle V.

Figure 5:
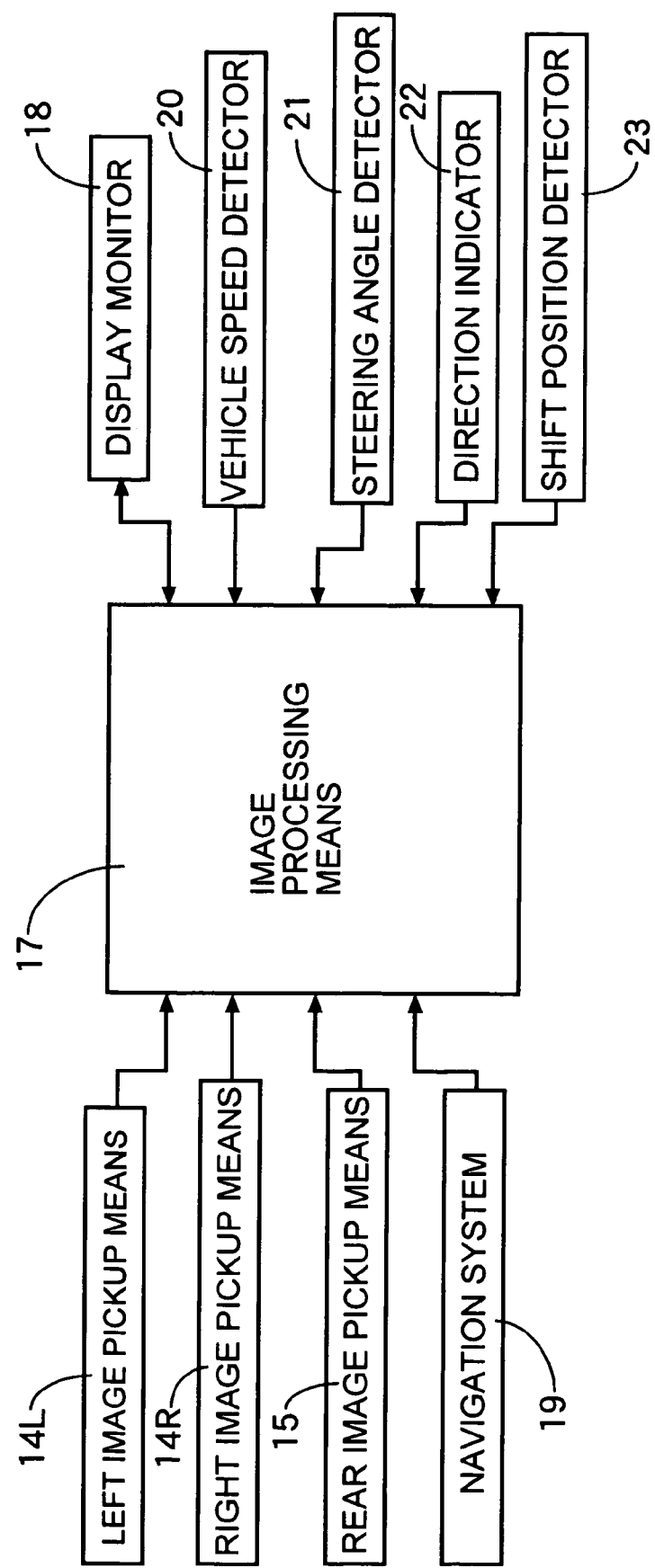

In FIG. 5, image signals from the left image pickup means 14L, the right image pickup means 14R, and the rear image pickup means 15 are inputted into image processing means 17. In addition to the image signals from the image pickup means 14L, 14R, and 15, a signal from a navigation system 19, a vehicle speed signal from a vehicle speed detector 20, a steering angle from a steering angle detector 21, a left-turn or right-turn signal from a direction indicator 22, and a signal from a shift position detector 23 for detecting a shift lever being in a backward position are inputted into the image processing means 17. The image processing means 17 processes an image based on these signals and displays the image on a display monitor 18.

Referring to FIG. 4, the display monitor 18 is disposed on an instrument panel 25 disposed so as to face the interior of a vehicle compartment at, for example, a position on the left-hand side of a steering wheel 24 so that a vehicle driver operating the steering wheel 24 can easily see the display monitor 18; and the image processing means 17 is housed within a housing box 26 which is installed within the instrument panel 25.

Figure 6:
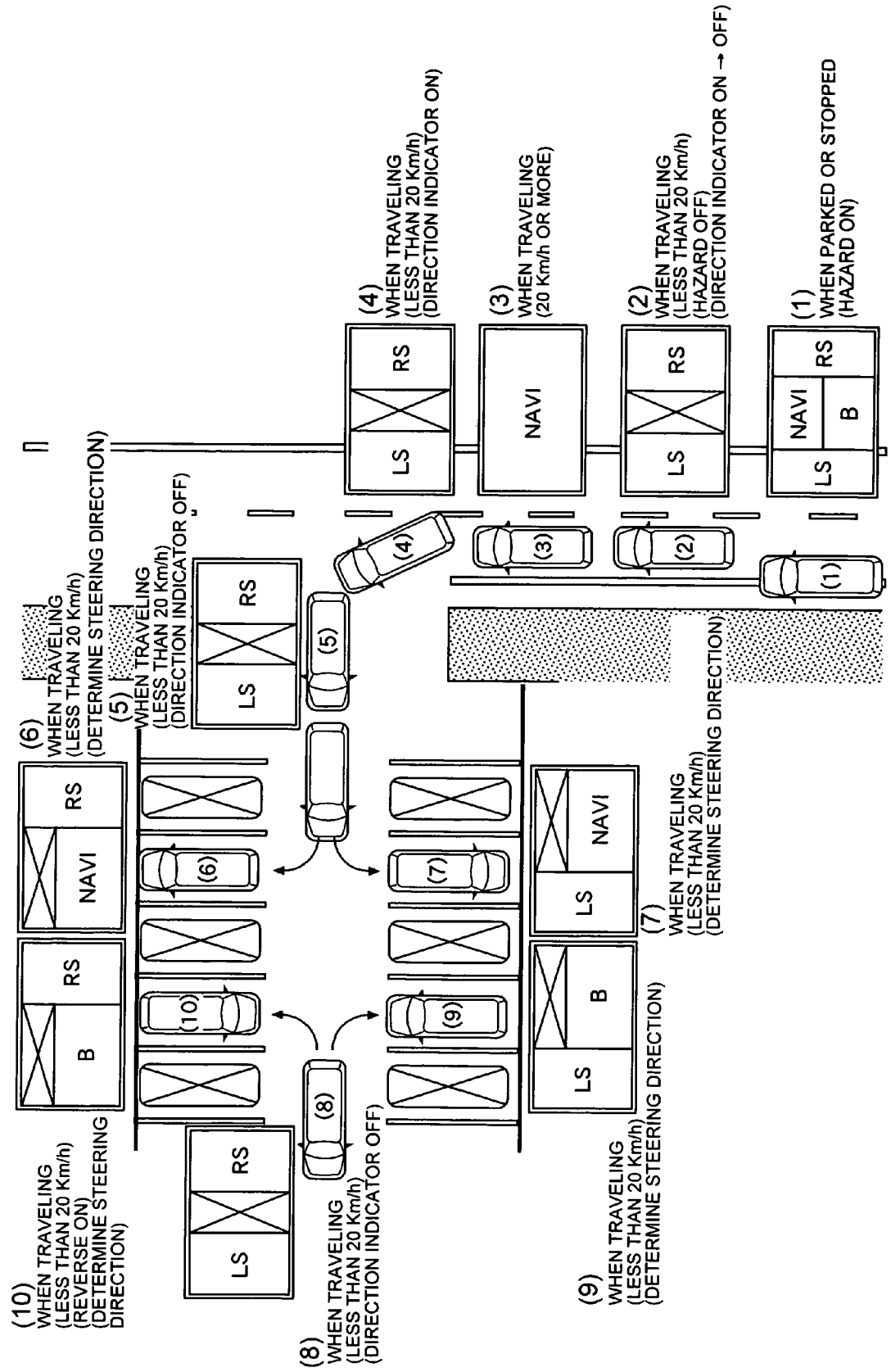

As shown in FIG. 6, the image processing means 17 selects images picked up by the image pickup means 14L, 14R, and 15, an image from the navigation system 19 and a display position, based on the vehicle speed signal from the vehicle speed detector 20, the steering angle from the steering angle detector 21, the left-turn or right-turn signal from the direction indicator 22, and the signal from the shift position detector 23; and displays them on the display monitor 18.

In FIG. 6, the image based on the image picked up by the left image pickup means 14L is denoted by 'LS', the image based on the image picked up by the right image pickup means 14R is denoted by 'RS', the image based on the image picked up by the rear image pickup means 15 is denoted by 'B', and the image based on the signal from the navigation system 19 is denoted by 'NAVI'. The image processing means 17 can display the images 'LS', 'RS', 'B' and 'NAVI' by dividing the display monitor 18 into a maximum of four sections.

Sequences (1) to (10) below describe how the display state of the display monitor 18 changes according to changes in driving conditions from the time when the vehicle V in a parked or stopped state starts traveling to the time when it is parked in a car park: (1) when the vehicle V is parked or stopped, four images 'LS', 'RS', 'B' and 'NAVI' are displayed on the display monitor 18 separately from each other; (2) in a state in which the vehicle V travels straight forward at a low speed of, for example, less than 20 km/h, 'LS' and 'RS' are displayed on left and right sections of the display monitor 18 with a middle section blank; and (3) in a state in which the vehicle V travels straight forward at a high speed of, for example, equal to or greater than 20 km/h, the image 'NAVI' is displayed on the whole screen of the display monitor 18.

Furthermore, (4) in a state in which the vehicle V travels at a low speed of, for example, less than 20 km/h and is turned left by operating the steering wheel 24 while operating the direction indicator 22 so as to show an intention to turn left in order to enter, for example, a car park, 'LS' and 'RS' are displayed on the left and right sections of the display monitor 18 with the middle section blank; (5) in a state in which the vehicle V travels straight forward at a low speed of, for example, less than 20 km/h within, for example, the car park, 'LS' and 'RS' are displayed on the left and right sections of the display monitor 18 with the middle section blank; (6) in a state in which the vehicle V changes direction in order to turn to the right ahead by operating the steering wheel 24 without operating the direction indicator 22 at a low speed of, for example, less than 20 km/h within, for example, the car park, the image 'RS' is displayed on the right section of the display monitor 18, and the image 'NAVI' is displayed on a lower side of the rest of the screen; and (7) in a state in which the vehicle V changes direction in order to turn to the left ahead by operating the steering wheel 24 without operating the direction indicator 22 at a low speed of, for example, less than 20 km/h within, for example, the car park, the image 'LS' is displayed on the left section of the display monitor 18, and the image 'NAVI' is displayed on a lower part of the rest of the screen.

Furthermore, (8) in a state in which the vehicle V travels straight back at a low speed of, for example, less than 20 km/h within, for example, the car park, 'LS' and 'RS' are displayed on the left and right sections of the display monitor 18 with the middle section blank; (9) when the vehicle V changes direction in order to turn to the left behind at a low speed of, for example, less than 20 km/h by operating the steering wheel 24, the image 'LS' is displayed on the left section of the display monitor 18 and the image 'B' is displayed on a lower part of the rest of the screen; and (10) when the vehicle V in the state (8) changes direction in order to turn to the right behind at a low speed of, for example, less than 20 km/h by operating the steering wheel 24, the image 'RS' is displayed on the right section of the display monitor 18 and the image 'B' is displayed on a lower part of the rest of the screen.

That is, the image processing means 17 does not display either the image 'LS' based on the image picked up by the left image pickup means 14L or the image 'RS' based on the image picked up by the right image pickup means 14R on the display monitor 18 when the vehicle travels at a high speed of, for example, equal to or greater than 20 km/h; but it displays either the image 'LS' or 'RS' on the display monitor 18 when the vehicle travels at a low speed of, for example, less than 20 km/h, and particularly when the direction is changed by operating the steering wheel 24 without operating the direction indicator 22, it selects, among the images 'LS' and 'RS', the image on the side to which the direction is changed, and displays it on the display monitor 18.

The vehicle driver seated on the driver's seat within the vehicle compartment has a direct view to the front through a windshield 27. This direct view is forward of a line of sight EL1 extending forward from an eye point EP of the vehicle driver via an upper face of a hood 28 of the vehicle V in FIG. 1, and is a region DA1 with lines slanting down to the right in FIG. 2. Furthermore, the vehicle driver has an indirect view to the rear of the vehicle V on both sides via the left and right door mirrors 12L and 12R. This indirect view is to the rear of a line of sight EL2 that extends from the eye point EP of the vehicle driver and is reflected to the rear on the left door mirror 12L in FIG. 1, and is a region IA with lines slanting down to the right in FIG. 2. Moreover, a region DA2 with lines slanting down to the right in FIG. 2 is a direct view region that the vehicle driver can view directly through a window of the front left door 11L, but this direct view region DA2 is a region sideward of and relatively far from the vehicle V, and is not directly related to the system of the present invention for assisting the sideways view in the vicinity of the vehicle V.

The left image pickup means 14L mounted on the housing 13L of the left door mirror 12L can pick up an image of a region PA extending from the front to the rear and sideward of the vehicle V, (a region with lines slanting down to the left in FIG. 2) that is continuous in the fore-and-aft direction while simultaneously including part of the region DA1 viewed directly by the vehicle driver on the driver's seat and part of the region IA viewed indirectly by the vehicle driver via the left door mirror 12L so that a blind spot does not occur between the directly viewed region DA1 which is on the left forward side and the indirectly viewed region IA which is on the left rearward side. The right image pickup means 14R mounted on the housing 13R of the right door mirror 12R can also pick up an image of a region that is continuous in the fore-and-aft direction while simultaneously including part of the region viewed directly on the right forward side by the vehicle driver on the driver's seat and part of the region viewed indirectly on the right rear side by the vehicle driver via the right door mirror 12R in the same manner as for the left image pickup means 14L.

The image processing means 17 displays on the display monitor 18, from among the images of the regions PA picked up by the image pickup means 14L and 14R, the picked up image of a region MA for which at least front and rear boundaries thereof respectively overlap the rear edge of the directly viewed region DA1 and the front edge of the indirectly viewed region IA. Specifically, the image processing means 17 processes an image signal from the left image pickup means 14L so as to display on the display monitor 18, out of the image of the region PA picked up by the left image pickup means 14L, the region MA that is continuous in the fore-and-aft direction while including a front overlap region PA1 overlapping the directly viewed region DA1 and a rear overlap region PA2 overlapping the indirectly viewed region IA.

When the vehicle V is viewed from the side, a point at which the optical axis RA of the left image pickup means 14L intersects the road surface is set according to the distance, in the fore-and-aft direction on a vertical plane that runs through the center of a lens of the left image pickup means 14L and is parallel to the fore-and-aft direction of the vehicle V, to the front overlap region PA1 where the region MA displayed on the display monitor 18 overlaps the directly viewed region DA1 and the distance to the rear overlap region PA2 where the imaged region PA overlaps the indirectly viewed region IA. That is, when the distances on the vertical plane in the foreand-aft direction to the front and rear overlap regions PA1 and PA2 are equal to each other, the optical axis RA is set so as to intersect the road surface at the same point as a bisector of the vertical plane of the region MA displayed on the display monitor 18; when the distance in the fore-and-aft direction to the front overlap region PA1 is larger than the distance in the fore-and-aft direction to the rear overlap region PA2, the optical axis RA is set so as to intersect the road surface forward of a point at which the bisector on the vertical plane of the region MA displayed on the display monitor 18 intersects the road surface; and when the distance in the fore-and-aft direction to the rear overlap region PA2 is larger than the distance in the fore-and-aft direction to the front overlap region PA1, the optical axis RA is set so as to intersect the road surface rearward of a point at which the bisector on the vertical plane of the region MA displayed on the display monitor 18 intersects the road surface.

When the vehicle V is viewed from the side, a point at which the optical axis of the right image pickup means 14R intersects the road surface is set in the same way as for the optical axis RA of the left image pickup means 14L.

Figure 7:
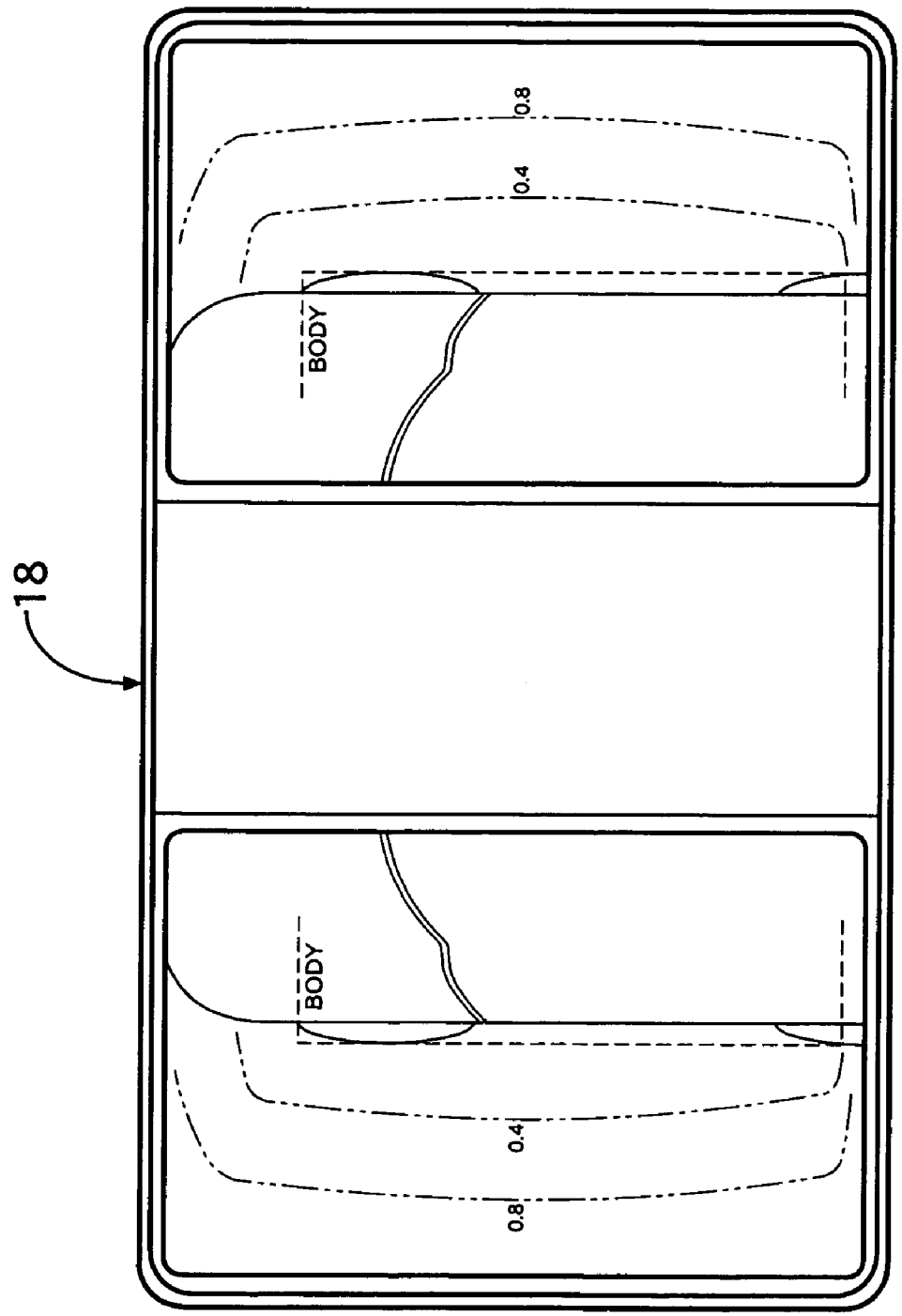

In accordance with such image processing by the image processing means 17, in a state in which the images 'LS' and 'RS' are displayed on the left and right sections of the display monitor 18, an image based on the image picked up by the left image pickup means 14L, and an image based on the image picked up by the right image pickup means 14R are displayed on the display monitor 18 as shown in FIG. 7, and these displayed images include not only the left-hand and right-hand sides of the vehicle body but also the corresponding front wheel and rear wheel.

Moreover, the image processing means 17 can carry out a superimposition, in which lines showing the left-hand edge and the right-hand edge of the vehicle, lines that are separated from the left-hand edge and the right-hand edge of the vehicle by, for example, 0.4 m, lines that are separated from the left-hand edge and the right-hand edge of the vehicle by, for example, 0.8 m, characters 'BODY' showing the side of the vehicle, and characters '0.4' and '0.8' denoting the distance of the lines from the side of the vehicle are displayed on the display monitor 18 while being superimposed on the image, and the lines are displayed with colors that are different from each other so as to be clearly recognized.

Figure 8:
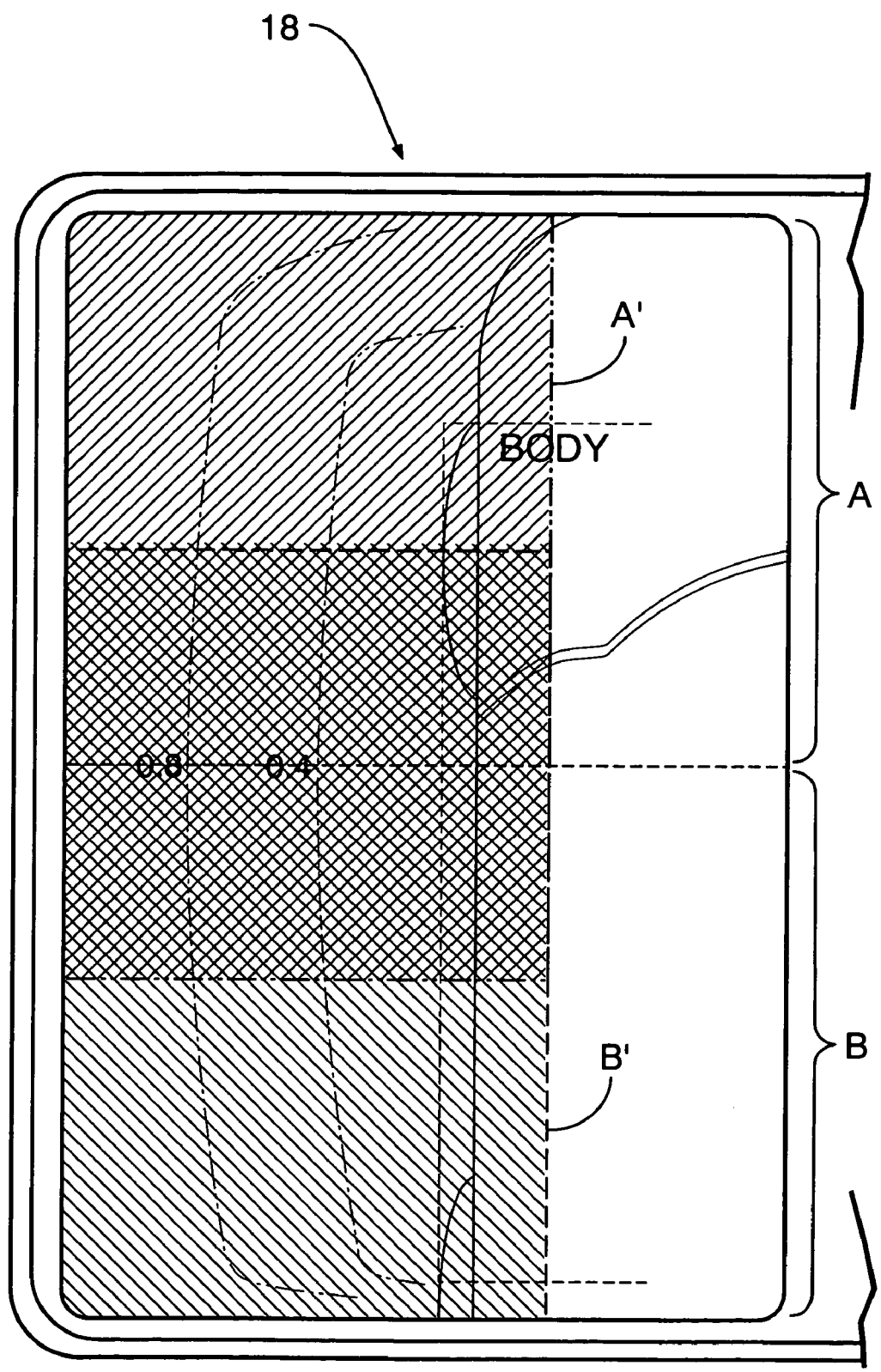
Figure 9:
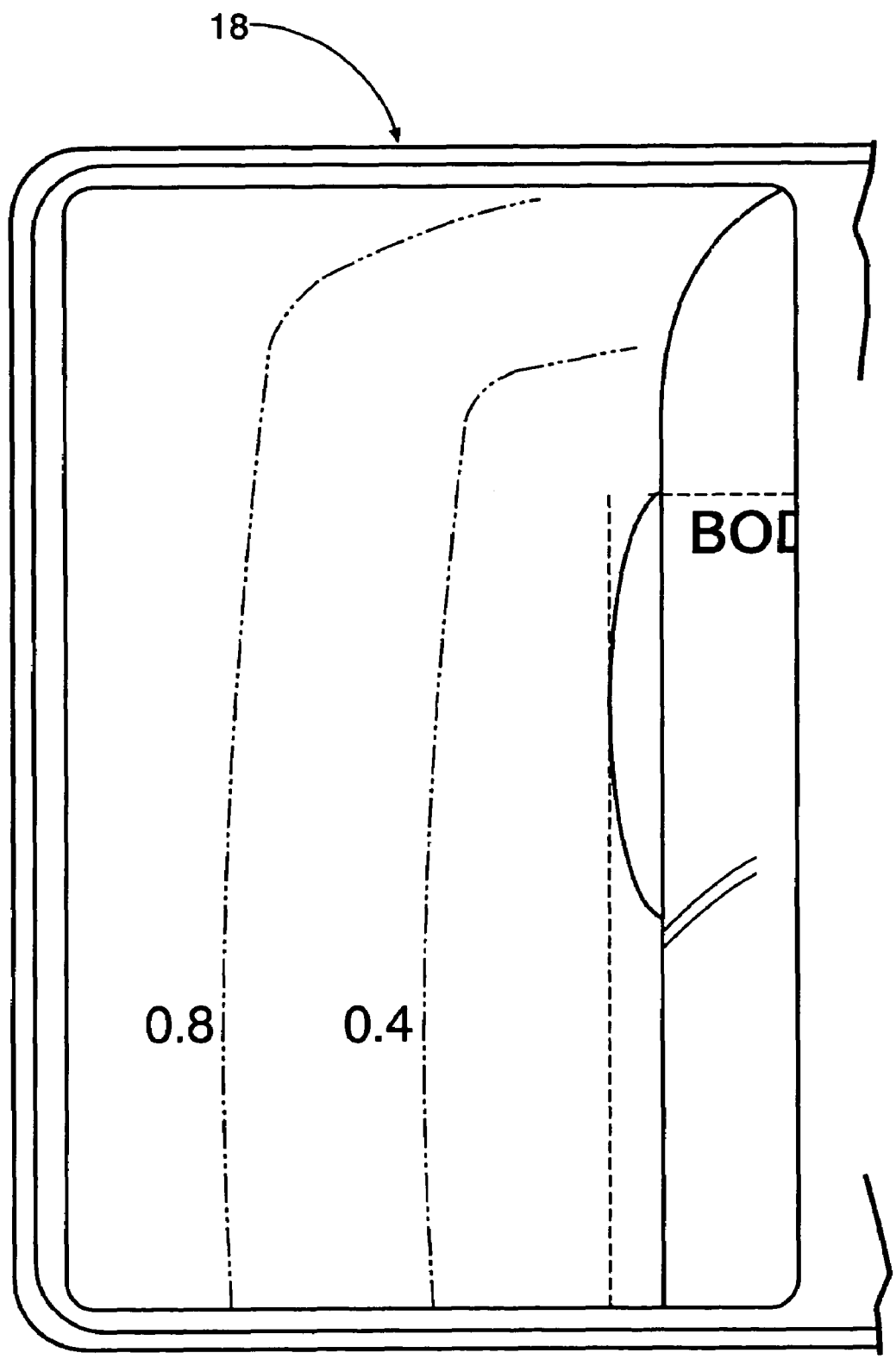

Furthermore, the display monitor 18 is equipped with a touch panel. In this touch panel, for example, an image displayed based on the image picked up by the left image pickup means 14L is, as shown in FIG. 8, divided into an upper instruction region A for enlarging and displaying a left forward region A' of the vehicle and a lower instruction region B for enlarging and displaying a left rear region B' of the vehicle, which partially overlaps the left forward region A' of the vehicle. When an occupant of the vehicle V touches either the upper instruction region A or the lower instruction region B with a finger so as to give an instruction, the image processing means 17 enlarges either the left forward region A' or the left rear region B' and displays it on the display monitor 18. For example, when the occupant touches the upper instruction region A with a finger to give an instruction as shown in FIG. 9 the image processing means 17 displays an enlarged image of the left forward region A' on the display monitor 18.

The operation of the first embodiment is now explained. The left and right image pickup means 14L and 14R are mounted on the lower part of the housings 13L and 13R of the door mirrors 12L and 12R. The left and right image pickup means 14L and 14R are capable of picking up an image of the region PA that is continuous in the fore-and-aft direction while simultaneously including part of the region DA1 to the front, which is viewed directly by the vehicle driver on the driver's seat, and part of the region IA to the rear, which is viewed indirectly by the vehicle driver via the door mirrors 12L and 12R. The image processing means 17 is capable of displaying an image obtained by processing an image signal picked up by the image pickup means 14L and 14R on the display monitor 18 provided within the vehicle compartment so that the vehicle driver can view it. The image processing means 17 displays on the display monitor 18, from among the images of the region PA picked up by the left and right image pickup means 14L and 14R, an image picked up from the region MA in which at least the front and rear boundaries thereof overlap the rear edge of the directly viewed region DA1 and the front edge of the indirectly viewed region IA.

Therefore, no blind spots occur between the direct and indirect views and the picked up image MA that is based on the images picked up by the left and right image pickup means 14L and 14R, and the safety over a long region to the side of the vehicle V in the fore-and-aft direction can easily be checked. Moreover, since the vehicle driver receives an impression that the direct and indirect views and the picked up image are continuous, the visibility for the vehicle driver can be improved.

Furthermore, since the image processing means 17 can display on the display monitor 18 an enlarged picked up image of only a necessary portion based on the instruction from the vehicle driver via the touch panel of the display monitor 18, it is possible to reliably recognize an obstacle, etc. present sideward of the vehicle V.

Moreover, the left and right image pickup means 14L and 14R are mounted respectively on the housings 13L and 13R of the left and right door mirrors 12L and 12R, and the image processing means 17 displays the picked up images based on the image signals from the two image pickup means 14L and 14R on the left and right sections of the display monitor 18 with a space therebetween. Therefore, it is possible to display the front and rear regions on the left-hand and right-hand sides of the vehicle V in a clearly discriminated manner on the display monitor 18, thus improving the visibility for the vehicle driver.

Furthermore, when the direction is changed while the vehicle is traveling at a low speed, the image processing means 17 selects a picked up image based on the image signal picked up by the right image pickup means 14R when changing direction to the right or selects a picked up image based on the image signal picked up by the left image pickup means 14L when changing direction to the left, and displays it on the display monitor 18, among the two sides of the vehicle, only the image picked up on the side to which the vehicle changes direction is displayed on the display monitor 18, thus improving the visibility for the vehicle driver.

Moreover, the left and right image pickup means 14L and 14R are mounted on the lower parts of the housings 13L and 13R of the door mirrors 12L and 12R so that the optical axes RA thereof intersect the straight line L1, which runs through the outer edge of the contact area 16 of the front wheel WF of the vehicle and is parallel to the fore-and-aft direction of the vehicle V, and further the optical axis RA intersects the road surface forward of the point at which the perpendicular line PL from the image pickup means 14L and 14R intersects the road surface when the vehicle V is viewed from the side. Therefore, as shown in FIG. 7 and FIG. 8, the side edges of the vehicle V are displayed on the display monitor 18 as straight lines without being distorted, thus giving an excellent visibility.

Figure 10:
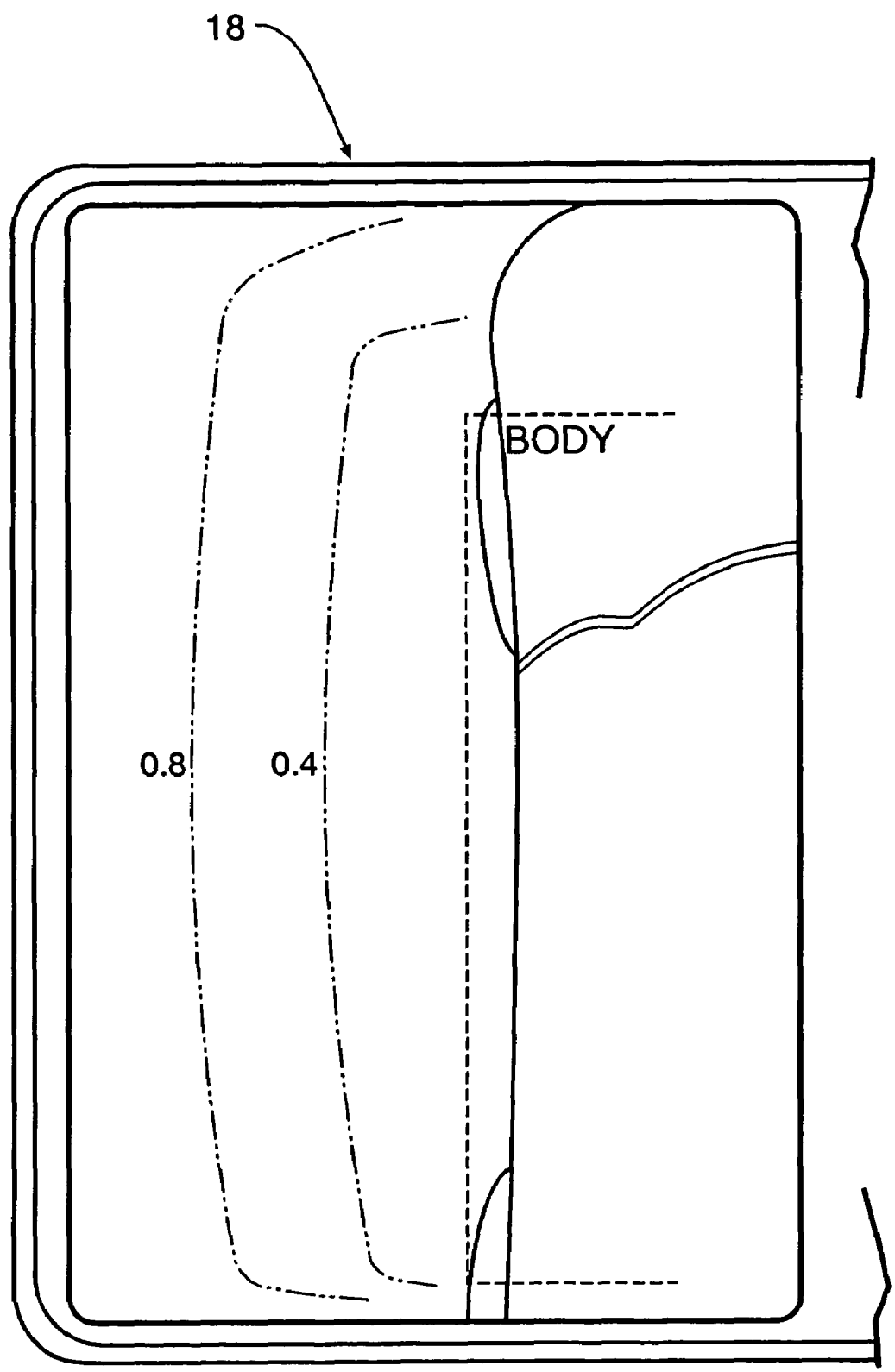
Figure 11:
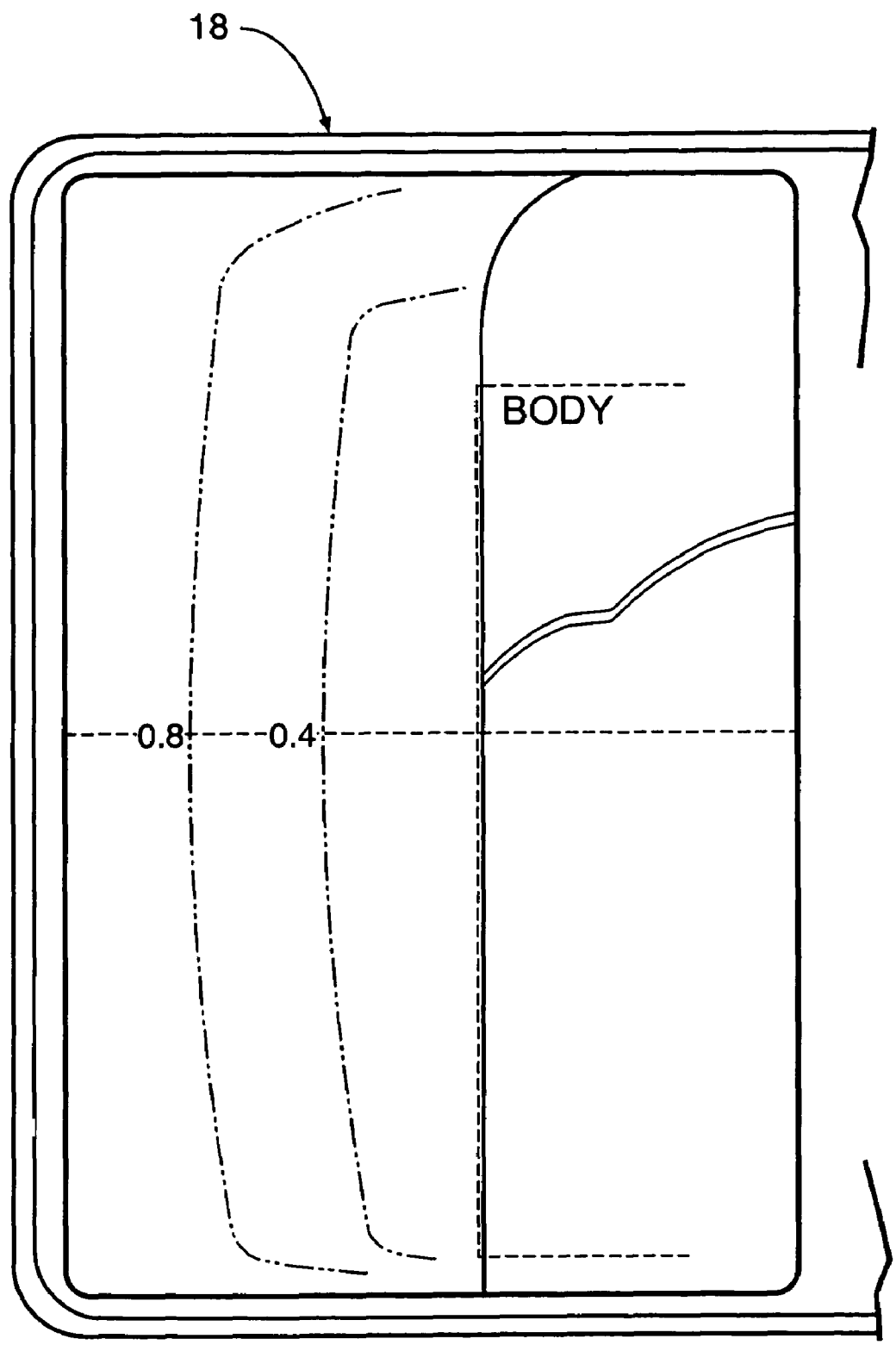

In contrast, when an optical axis RA' is set, as shown by a double dotted broken line in FIG. 3, so as to deviate from the straight line L1 that runs through the outer edge of the contact area 16 of the front wheel W and is parallel to the fore-and-aft direction of the vehicle V, the side edge of the vehicle V on the display monitor 18 is distorted as shown in FIG. 10. Thus, in such a case where the vehicle is parked along a side wall, it becomes difficult to park the vehicle V parallel to the side wall. Furthermore, when the positions at which the image pickup means 14L and 14R are mounted are set so that an optical axis RA" runs through the sidemost edge of the vehicle V as shown by a double dotted broken line in FIG. 3, a wheel portion is not displayed on the display monitor 18 as shown in FIG. 11, and a blind spot thus occurs sideward of the vehicle V.

Figure 12:
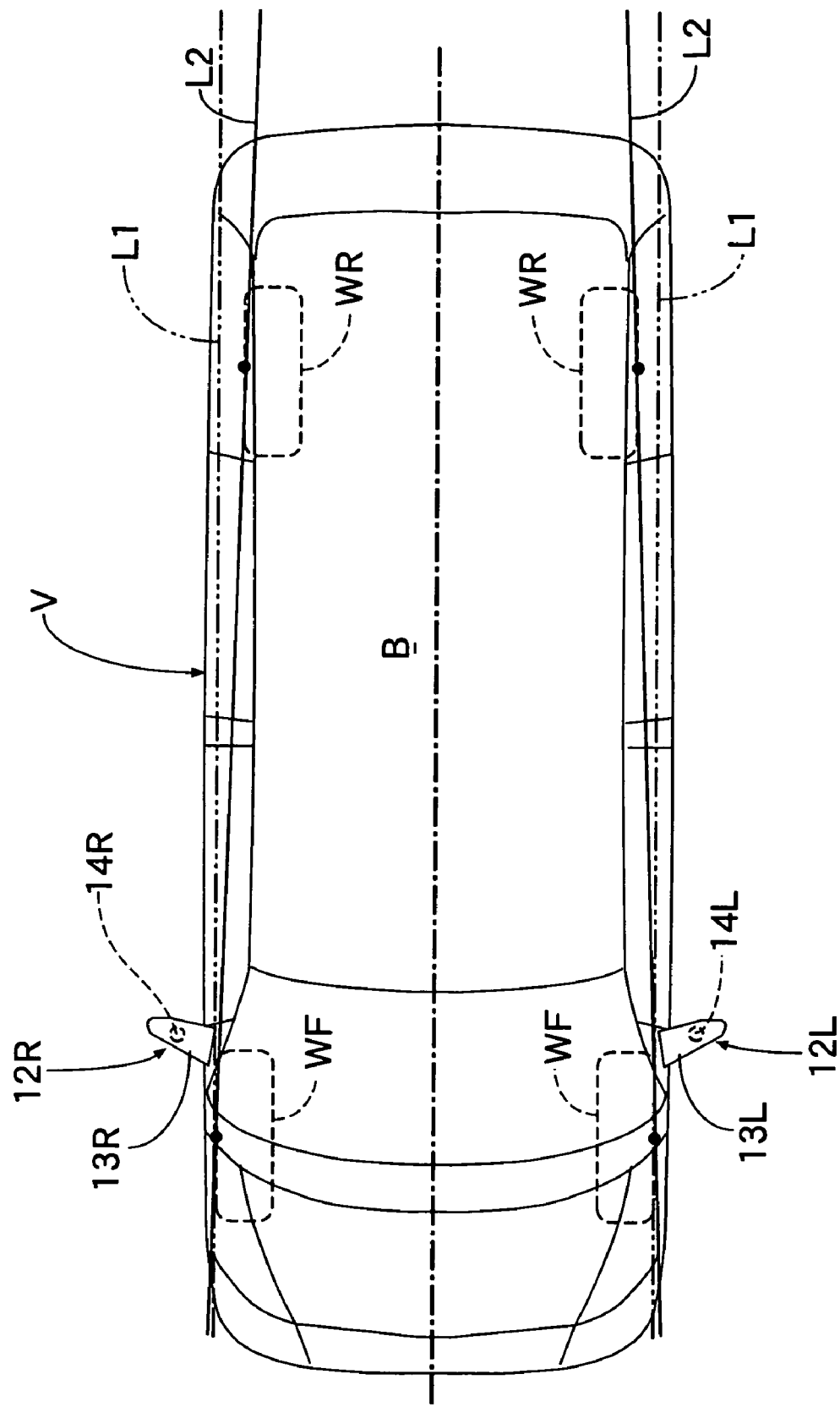
FIG. 12 is a plan view of a vehicle for explaining the setting of a straight line that an optical axis is made to intersect in a second embodiment.

As in a second embodiment of the present invention, as shown in FIG. 12, when the distance of front left and right wheels WF from a central line C along the fore-and-aft direction of a vehicle V is different from the distance of rear left and right wheels WR from the central line C, optical axes of image pickup means 14L and 14R mounted on lower parts of housings 13L and 13R of door mirrors 12L and 12R may intersect straight lines L2 joining together outer edges of contact areas of the left and right front wheels WF and outer edges of contact areas of the left and right rear wheels WR. In this case, the straight line L2 is set, for example, so as to join together the outer edge of a middle part in the fore-and-aft direction of the contact area of the front wheel WF and the outer edge of a middle part in the fore-and-aft direction of the contact area of the rear wheel WR.

In accordance with this second embodiment, it is possible to reliably display on a display monitor 18 portions of the front wheels WF and the rear wheels WR so that a blind spot does not occur to the side of the vehicle V, and to display on the display monitor 18 side edges of the vehicle as a straight line without distortion, thus giving an excellent visibility.

Figure 13:
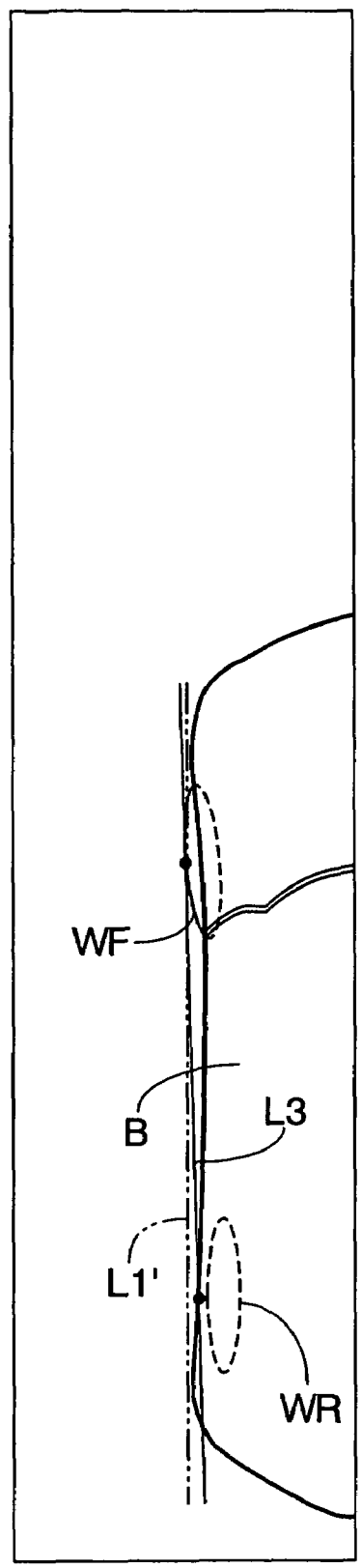
FIG. 13 is a diagram showing an image picked up by image pickup means for explaining the setting of a straight line that an optical axis is made to intersect in a third embodiment.

As in a third embodiment of the present invention, when, due to the distance of rear left and right wheels WR from a central line C along the fore-and-aft direction of a vehicle V being smaller than the distance of front left and right wheels WF from the central line C, the rear wheels WR are not included in the images picked up by image pickup means 14L and 14R mounted on lower parts of housings 13L and 13R of door mirrors 12L and 12R because of obstruction by a vehicle body B as shown in FIG. 13, the image pickup means 14L and 14R may be disposed so that an optical axis RA intersects a straight line L3 joining together the outer edge of a contact area of the front wheel WF and a point that is a projection on a road surface of the outer edge of the vehicle body B which is positioned outside of the rear wheel WR in a portion corresponding to the rear wheel WR. In this case, the straight line L3 is set, for example, so as to join together the outer edge of a middle part in the fore-and-aft direction of the contact area of the front wheel WF and a point that is the projection on the road surface of the outer edge of the vehicle body B positioned outside the rear wheel WR in the portion corresponding to the rear wheel WR.

In accordance with this third embodiment, it is possible to reliably display a portion of the front wheel WF on the display monitor 18 without a blind spot occurring to the side of the vehicle V, and to display on the display monitor 18 the side edge of the vehicle V as a straight line without distortion, thus giving an excellent visibility.

In the above-mentioned embodiments, the touch panel of the display monitor 18 is divided into two instruction regions, that is, the upper instruction region A and the lower instruction region B, and by touching either one of these instruction regions A and B with a finger so as to give an instruction, one of the regions A' and B' determined in advance to correspond to the instruction regions A and B is enlarged and displayed on the display monitor 18. However, as in another embodiment of the present invention, the touch panel may be a drag type or a two point instruction type so that any region on the display monitor 18 may be freely enlarged and displayed.

Although embodiments of the present invention have been described above, the present invention is not limited to the above-mentioned embodiments and can be modified in a variety of ways without departing from the subject matter of the present invention described in the claims.

For example, in the embodiments, when direction is changed by operating the steering wheel 24 without operating the direction indicator 22, among images based on the images picked up by the left and right image pickup means 14L and 14R, an image on the side to which the direction is changed is selected and displayed on the display monitor 18, but also when the direction is changed while operating the direction indicator 22, among images based on the images picked up by the left and right image pickup means 14L and 14R, an image on the side to which the direction is changed may be selected and displayed on the display monitor 18.

What is claimed is:

1. A vehicular visual assistance system, comprising:
   image pickup means mounted on a housing of a mirror mounted externally on a side portion of a vehicle, the image pickup means being capable of picking up an image of a fore-and-aft region extending from an outer edge of a vehicle tire outwardly along the side portion of the vehicle;
   a display monitor provided within a vehicle compartment, the display monitor being visible to a vehicle driver; and
   image processing means for displaying on the display monitor an image obtained by processing an image signal from the image pickup means,
   wherein the image pickup means is mounted on a lower part of the housing and is capable of picking up an image of a region which is continuous in the fore-and-aft direction while simultaneously including part of a front region directly viewed by a vehicle driver on a driver's seat and part of a rear region indirectly viewed by the vehicle driver via said mirror, and
   wherein the image processing means displays on the display monitor a picked up image of a region, among the regions whose images have been picked up by the image pickup means, for which at least front and rear boundaries thereof overlap the rear edge of the directly viewed region and the front edge of the indirectly viewed region, respectively.

2. The vehicular visual assistance system according to claim 1, wherein the image processing means has a function of displaying on the display monitor an enlarged picked up image of only a necessary part based on an instruction from the vehicle driver.

3. The vehicular visual assistance system according to claim 1 or 2, wherein the image pickup means are mounted respectively on housings of left and right door mirrors; and the image processing means displays picked up images spaced from each other on the left and right parts of the display monitor, based on image signals from left and right image pickup means.

4. The vehicular visual assistance system according to claim 1 or 2, wherein the image pickup means are mounted respectively on housings of left and right door mirrors; and when the vehicle changes direction the image processing means selects a picked up image based on, among image signals from the left and right image pickup means, the image signal from the side to which the direction changes, and displays it on the display monitor.

5. The vehicular visual assistance system according to claim 1, wherein the image pickup means is mounted on a lower part of the housing so that an optical axis intersects a straight line which runs through an outer edge of a contact area of a front wheel of the vehicle and which is parallel to the fore-and-aft direction of the vehicle.

6. The vehicular visual assistance system according to claim 1, wherein the image pickup means is mounted on a lower part of the housing so that an optical axis intersects a straight line joining together outer edges of contact areas of a front wheel and a rear wheel of the vehicle.

7. The vehicular visual assistance system according to claim 1, wherein the image pickup means is mounted on a lower part of the housing so that an optical axis intersects a straight line joining together an outer edge of a contact area of a front wheel of the vehicle and a point that is a projection on a road surface of an outer edge of a vehicle body positioned outside a rear wheel in a portion corresponding to the rear wheel of the vehicle.

8. In a vehicle of the type having a vehicle body and a plurality of tires operatively supporting the vehicle body, the improvement comprising a vehicular visual assistance system comprising:
a camera mounted on a lower part of a mirror housing which contains a side mirror of the vehicle, the camera being capable of picking up a substantially continuous image of a fore-and-aft surface region extending from an outer edge of one of said tires outwardly along a side portion of the vehicle;
a display monitor provided within a vehicle compartment, the display monitor being situated in the vehicle so as to be visible to a vehicle driver; and
a processor for displaying, on the display monitor, an image obtained by processing an image signal from the camera,
wherein the camera is capable of picking up an image of a surface region which is continuous in the fore-and-aft direction while simultaneously including part of a front surface region directly viewable by a vehicle driver on a driver's seat, and part of a rear surface region indirectly viewable by the vehicle driver via the mirror,
wherein during use of the vehicular visual assistance system, the processor displays a picked up image of a selected surface region, whose images have been picked up by the camera, on the display monitor,
wherein at least front and rear boundaries of the selected surface region overlap the rear edge of the directly viewed surface region and the front edge of the indirectly viewed surface region, respectively, and
wherein the camera is mounted on the lower part of the housing so that an optical axis intersects a straight line which runs through an outer edge of a contact area of the front wheel and another point, such that portions of the front wheel and the rear wheel are displayed on the display monitor.

9. A vehicular visual assistance system, comprising:
image pickup means mounted on a housing of a door mirror, the image pickup means being capable of picking up an image of a fore-and-aft region sideward of a vehicle;
a display monitor provided within a vehicle compartment, the display monitor being visible to a vehicle driver; and
image processing means for displaying on the display monitor an image obtained by processing an image signal from the image pickup means,
wherein the image pickup means is mounted on a lower part of the housing so that an optical axis intersects a straight line which runs through an outer edge of a contact area of a front wheel of the vehicle and which is parallel to a fore-and-aft direction of the vehicle.

10. A vehicular visual assistance system, comprising:
image pickup means mounted on a housing of a door mirror, the image pickup means being capable of picking up an image of a fore-and-aft region sideward of a vehicle;
a display monitor provided within a vehicle compartment, the display monitor being visible to a vehicle driver; and
image processing means for displaying on the display monitor an image obtained by processing an image signal from the image pickup means,
wherein the image pickup means is mounted on a lower part of the housing so that an optical axis intersects a straight line joining together outer edges of contact areas of a front wheel and a rear wheel of the vehicle.

11. A vehicular visual assistance system, comprising:
image pickup means mounted on a housing of a door mirror, the image pickup means being capable of picking up an image of a fore-and-aft region sideward of a vehicle;
a display monitor provided within a vehicle compartment, the display monitor being visible to a vehicle driver; and
image processing means for displaying on the display monitor an image obtained by processing an image signal from the image pickup means,
wherein the image pickup means is mounted on a lower part of the housing so that an optical axis intersects a straight line joining together an outer edge of a contact area of a front wheel of the vehicle and a point that is a projection on a road surface of an outer edge of a vehicle body positioned outside a rear wheel in a portion corresponding to the rear wheel of the vehicle.

12. The vehicular visual assistance system according to claim 9, wherein the regions whose images have been picked up by the image pickup means include a region directly below the door mirror.

13. The vehicular visual assistance system according to claim 10, wherein the regions whose images have been picked up by the image pickup means include a region directly below the door mirror.

14. The vehicular visual assistance system according to claim 11, wherein the regions whose images have been picked up by the image pickup means include a region directly below the door mirror.

15. The vehicular visual assistance system according to claim 1, wherein the regions whose images have been picked up by the image pickup means include a region directly below said mirror.

* * * * *